US005359387A

United States Patent [19]

Hicks

[11] Patent Number: 5,359,387

[45] Date of Patent: Oct. 25, 1994

[54] PHOTOGRAPHIC PROCESS UTILIZING COMBINED PRINT AND ORDER FORM

[76] Inventor: Ray Hicks, 2605 Corunna Rd., Flint, Mich. 48503

[21] Appl. No.: 908,374

[22] Filed: Jul. 6, 1992

[51] Int. Cl.[5] .............. G03B 27/52

[52] U.S. Cl. .............. 355/40; 355/41; 355/77

[58] Field of Search .............. 355/40, 41, 68, 77

[56] References Cited

U.S. PATENT DOCUMENTS

| | | | |
|---|---|---|---|
| 4,195,923 | 4/1980 | Craven | 354/109 X |
| 4,607,949 | 8/1986 | Hakamada et al. | 355/40 |
| 4,849,809 | 7/1989 | Tahara et al. | 355/40 X |
| 5,023,655 | 6/1991 | Hicks | 355/40 X |

OTHER PUBLICATIONS

JD School Pictures.
1992–1993 School Picture Program.

*Primary Examiner*—D. Rutledge
*Attorney, Agent, or Firm*—Krass & Young

[57] ABSTRACT

A photographic process for institutional groups in which several exposures are taken of each subject in the group. After the film is developed, the negatives are printed in proof form on a single sheet of proof paper and an order form is simultaneously printed on the same sheet of proof paper to create a combined print and order form. The combined print and order form is delivered to the subject with an envelope including information with respect to packages symbolically identified on the order form, the subject marks the order form to indicate the packages desired for each proof print, the subject returns the marked combined print and order form with payment in the envelope to the photographic lab and the photographic lab, produces final photographic prints from the order information contained on the combined print and order form.

6 Claims, 2 Drawing Sheets

PHOTOGRAPHIC PROCESS UTILIZING COMBINED PRINT AND ORDER FORM

FIELD OF THE INVENTION

This invention relates to photographic prints and more particularly to equipment and processes for facilitating the marketing and production of institutional photographs.

It is common practice to photograph the individual members of institutions or groups such as school children, church congregations, clubs and other organizations. Since these photographs typically involve a large number of exposures of a large number of subjects it is important that the correlation of the subjects with the exposures be carefully monitored and it is further important in the interest of profitability, to provide a process for producing final photographic prints that is cost efficient.

Correlation may be done by the use of a "slate" frame in which the first member of a group holds up a small chalkboard or other card which contains information about the group. The photographer then photographs the entire group in serial fashion, using an alphabetical list of the members of the group and taking the photographs of the members in alphabetical order. In this way the photo lab and photographer have a means of correlating the photos with the exposures. Recently, more advanced methods have been developed including methods for imprinting data directly on the photographic film through the camera, and methods for electronically correlating a given camera exposure to electronic data which is stored simultaneously with the taking of the exposure.

Typically each group member selects his order composition (that is number and size of photograph desired) through an order form prior to the actual photographic processing. Specifically, before the photographic sitting, a subject, (or more likely, in the case of a student, the subject's parents) selects the number of finished photos that will be ordered and their sizes. Each subject typically has a single pose and all photographs, whatever their size, duplicate that pose.

It is of course more attractive to take a number of exposures of each subject and offer "proof prints" from which the subject can select a desired print or prints of a desired size and number, but this procedure adds considerably to the expense of the entire process, especially when dealing with relatively small groups. When providing multiple exposures for each subject, or "proof prints", proof photographs are developed by the photographer and returned to the subject with a separate order form. These proofs are typically printed on a "contact sheet" wherein the negatives containing the developed exposures of each subject are placed directly on photographic paper for purposes of making the exposure, whereafter the subject selects one or more poses and one or more packages of photographs for each of the selected poses and returns the proofs and the order form to the laboratory, whereafter the laboratory matches the order form and proofs to the negatives. This entire process is very labor intensive, very expensive, and very error prone.

SUMMARY OF THE INVENTION

The present invention is directed to the provision of an improved method and apparatus for producing final positive photographic prints of a single subject from a plurality of varying photographic exposures of the subject representing varying poses.

According to the invention, the exposures are developed to produce a plurality of negatives, a plurality of proof prints are made from the negatives on a single sheet of photographic proof paper, and an order form for ordering final photographic prints is printed on the single sheet of proof paper. This methodology greatly simplifies the process of producing final photographic prints from a plurality of exposures and enables the process to be carried out in a cost effective manner.

According to a further feature of the invention, the order form is printed on the proof paper at the same time that the negatives are printed on the proof paper. This methodology further simplifies the entire process and further enhances the cost effectiveness of the process.

According to a further feature of the invention, the order form includes provision to indicate the number and size of photographic prints to be made from each selected proof.

According to a further feature of the invention, the order form includes provision to order symbolically identified packages with respect to each proof and the single sheet of photographic proof paper is delivered to the subject with an envelope on which is imprinted information with respect to the content of the various symbolically identified packages on the order form.

The invention further provides a combined print and order form including a single sheet of photographic proof paper including a plurality of proof prints, representing varying photographic exposures of a subject representing varying poses, and an order form printed on the single sheet of proof paper and including provision to select one or more proof from which final photographic prints are to be made.

According to a further feature of the invention, the order form further includes provision to indicate the number and size of photographic prints to be made from the selected proofs.

According to a further feature of the invention, the order form includes provision to order symbolically identified packages with respect to each proof and the single sheet of photographic proof paper is accompanied by an envelope on which is imprinted information with respect to the content of the various symbolically identified packages on the order form.

DETAILED DESCRIPTION OF THE PREFERRED EMBODIMENT

The invention is utilized to photograph the individual members of an institution or group and is intended to allow each subject in the group to choose finished photographic prints from a variety of proof prints in a cost effective manner.

Figure 1:
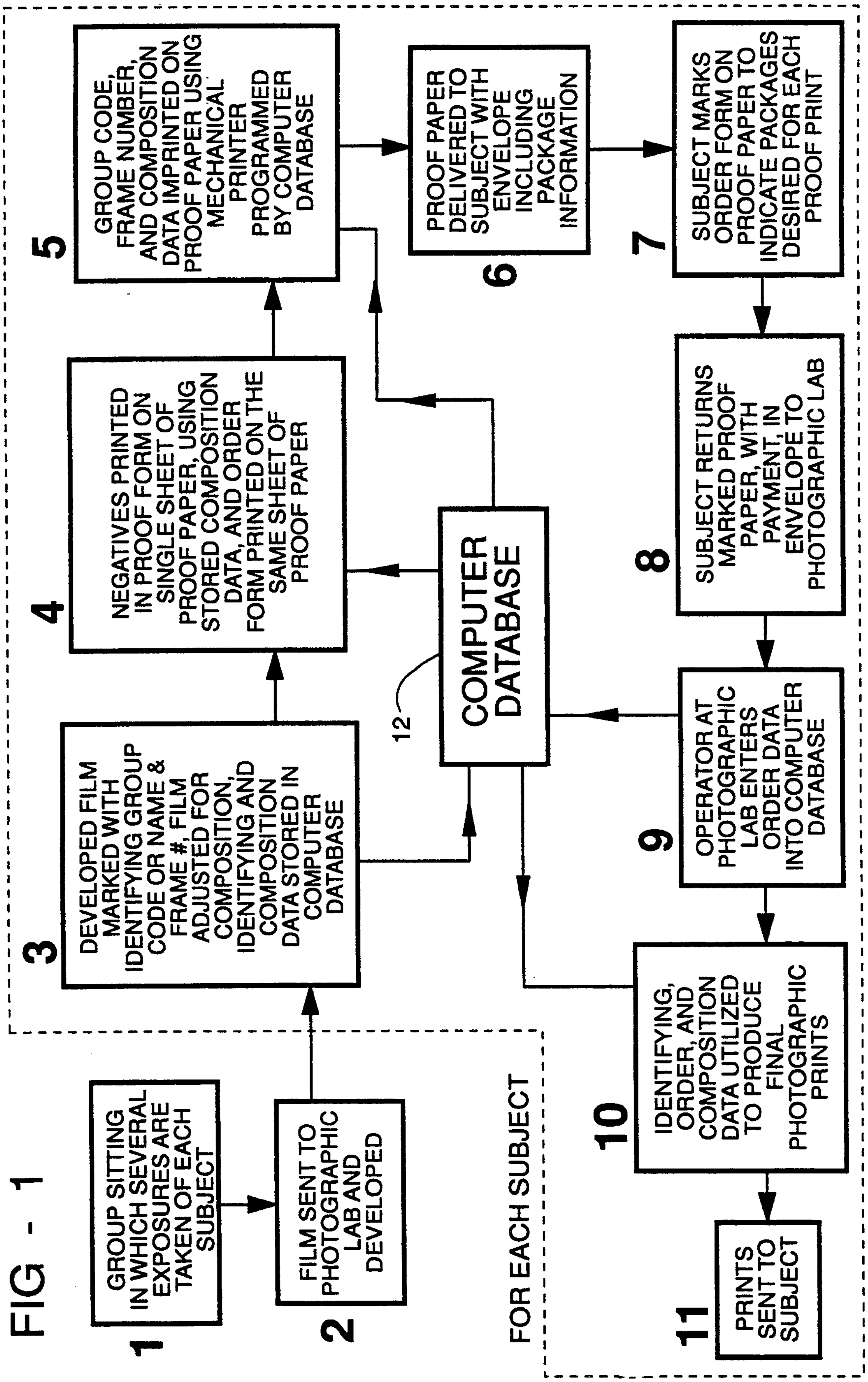
FIG. 1 is a flow diagram of the photographic process according to the invention.
Figure 2:
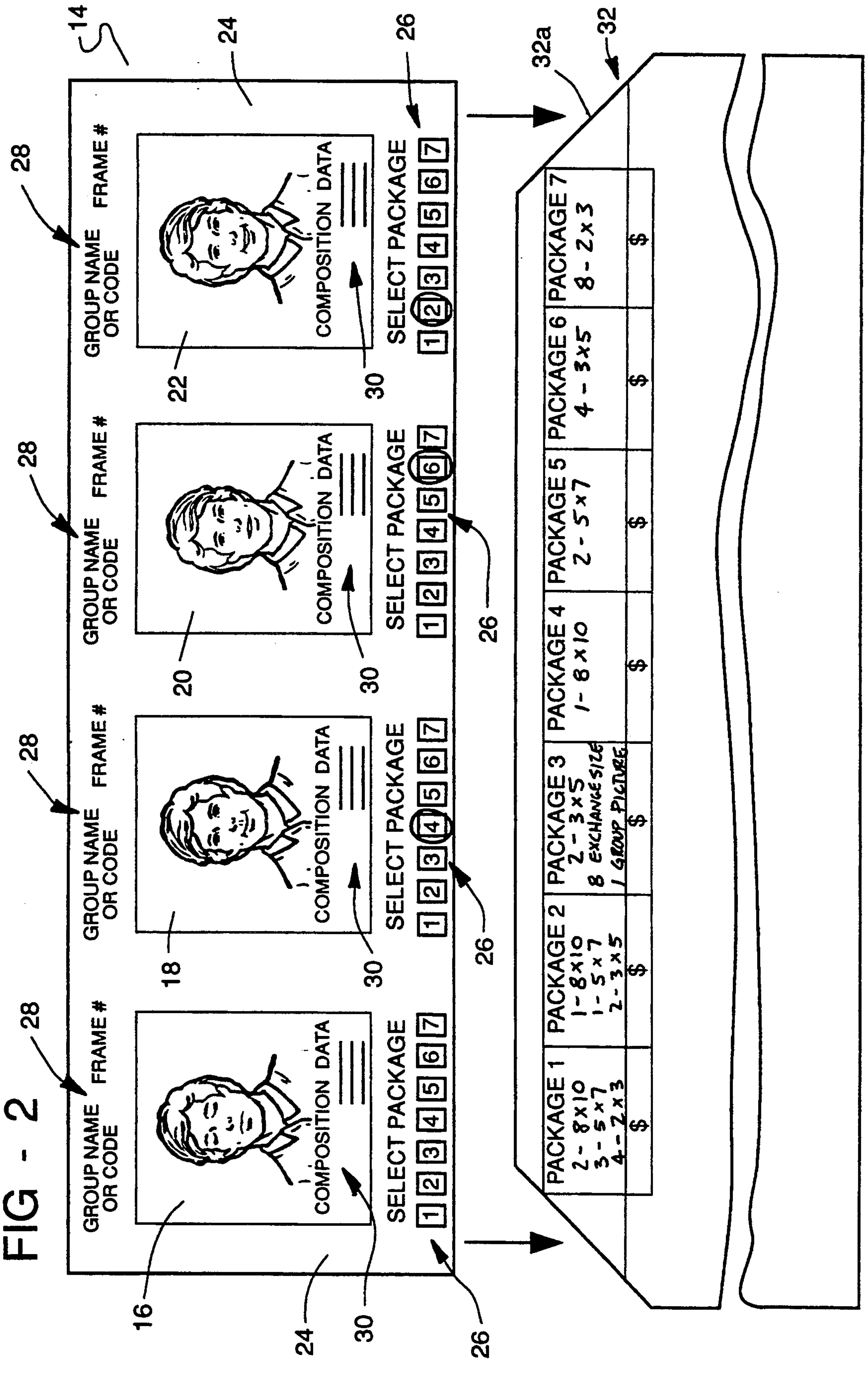
FIG. 2 is a view of a combined print and order form utilized in the invention process.

The invention is shown in flow diagram form in FIG. 1 and a combined print and order form utilized in the process of FIG. 1 is shown in FIG. 2.

In the process of FIG. 1 each step in the process is shown by a sequentially numbered block and the steps in the process that are carried out separately for each subject of the group are shown within the dash line border.

To begin the invention process, and as seen in block 1, a group setting is conducted for the selected institutional group (such for example a school class, a church congregation, a club, etc.) and several exposures (for example four) are taken of each subject representing varying poses. A sample pose sequence is shown for example in FIG. 2. After the plurality of exposures have been taken of each subject of the group, the exposed film is sent to the photographic lab and developed in known manner as represented by block 2. It will be understood that the process steps 3–11 are carried out individually for each subject of the group. Thus, for each subject, the developed film, as seen in block 3, is marked with an identifying group code or name and a frame member, whereafter the film is adjusted for composition, whereafter the identifying data and the composition data are stored in a computer data base represented by block 12.

Thereafter, as seen in block 4, the negatives are printed in proof form on a single sheet of proof paper or "contact sheet" using stored composition data from the computer data base, and an order form is printed on the same sheet of proof paper simultaneously with the printing of the proof prints. The order form is printed on the proof paper using either a computer generated image or a previously prepared photographic negative image.

A sample combined print and order form is seen at 14 in FIG. 2 in which four exposures 16, 18, 20 and 22 of the subject are printed on a sheet of photographic proof paper 24 in side-by-side relation and an order form 26 is printed beneath each photographic print with each order form comprising a series of blocks numbered, for example, 1 through 7 with printed directions above each series of blocks to "SELECT PACKAGE."

Returning to FIG. 1, and in particular block 5, the group code, frame number and composition data are now imprinted on the proof paper using a mechanical or character printer mechanism programmed by group code, frame number, and composition data stored in the computer data base. Group code and frame number data 28 are shown in FIG. 2 above each proof print and the composition data 30 is shown in FIG. 2 on the lower portion of each proof print.

The combined print and order form 14 is now delivered to the subject with an envelope 32 sized to receive the combined print and order form and including detailed information with respect to the packages symbolically identified on the combined print and order form by the package number blocks 1–7. For example, as seen in FIG. 2, the inside of the flap **32*a* of the envelope 16 may have imprinted thereon information detailing the contents of each of the packages 1, 2, 3, 4, 5, 6 and 7 identified symbolically beneath each print of the combined print and order form 14** and indicating the price of each package.

Using the combined print and order form 14 and the information provided on the flap **32*a* of envelope 32, the subject marks the order form on the combined print and order form to indicate the packages desired for each proof print. For example, if no prints are desired of proof print 16, no packages are selected on the order form 26 appearing beneath that proof print; if a package 4 is desired of proof print 18 (indicating 1 8×10) the subject circles or otherwise checks package 4 on the order form beneath the proof print 18; if a package 6 is desired of proof print 20 (indicating 4 3×5 prints) the subject circles or otherwise checks package 6 on the order form beneath proof print 20; and if a package 2 is desired for proof print 22 (indicating 1 8×10, 1 5×7 and 2 3×5) the subject circles or otherwise checks package 2 on the order form beneath the print 22. This step in the process is indicated by box 7 in FIG. 1**.

Following the selection of the desired final photographic prints, by appropriate use of the order forms printed beneath each proof print, the subject deposits the marked print and order form in the envelope 32, places a payment in the envelope corresponding to the combined price of the packages selected, and returns the marked print and order form, with the payment, in the envelope to the photographic lab, as depicted in block 8 of FIG. 1.

Upon receipt of the envelope containing the print and order form and payment (and as seen in block 9 of FIG. 1) an operator at the photographic lab enters order data into the computer data base 12 corresponding to the packages selected of each proof print by the subject. Alternatively, the marks made on the order form 26 by the subject may be machine readable in which case the order data from the order forms may be automatically entered into the computer data base by passing the combined print and order form through a suitable read device.

Thereafter, as seen in block 10, the identifying data, the order data, and the composition data are supplied from the computer data base and are utilized to produce the final photographic prints.

Specifically, the data is utilized to produce 1 8×10 final photographic print of proof print 18; 4 3×5 final photographic prints of proof print 20; and 1 8×10, 1 5×7 and 2 3×5 final photographic prints of proof print 22.

To complete the process, and as seen in block 11 of FIG. 1, the final photographic prints are sent to the subject.

The invention will be seen to provide a cost effective process for providing several proof prints to each subject of an institutional grouping. Specifically, the invention process allows automated, faster order entry to initiate the final printing process by eliminating the necessity to visually correlate film, proofs and order forms; eliminates the separate paper order form to thereby eliminate the possibility of the order form being lost or the order form and associated prints becoming separated; and allows for easy customization of the order form to suit the peculiar needs of any particular institutional group.

Whereas the preferred embodiment of the invention has been illustrated and described in detail, it will be apparent that various changes may be made in the disclosed embodiment without departing from the scope or spirit of the invention.

I claim:

1. A method of facilitating the production of final positive photographic prints of a subject from a photographic exposure of the subject characterized in that the exposure is developed to produce a negative, a proof print is made from the negative on a sheet of photographic proof paper, and order information enabling a customer to order specific sizes and quantities of final photographic prints is printed on the sheet of photographic proof paper proximate the print image to create a combined print and order form and thereby eliminate the necessity of providing a separate order form and eliminate the necessity of correlating separate order forms with separate proof prints to produce the final positive photographic prints.

2. A method according to claim 1 wherein the order information is printed on the proof paper at the same time that the negative is printed on the proof paper.

3. A method according to claim 1 wherein the order information includes provision to order symbolically identified packages of final positive photographic prints and the combined print and order form is delivered to the subject with an envelope on which is imprinted information with respect to the content of the various symbolically identified packages on the order form.

4. A method of facilitating the production of final positive photographic prints of a single subject from the plurality of varying photographic exposures of a subject representing varying poses, characterized in that the exposures are developed to produce a plurality of negatives, a plurality of proof prints are made from the negatives on a single sheet of photographic proof paper, and order information enabling a customer to order specific sizes and quantities of final photographic prints of each proof print is printed on the single sheet of proof paper proximate the respective proof prints to create a combined print and order form and thereby eliminate the necessity of providing a separate order form and eliminate the necessity of correlating separate order forms with separate proof prints to produce the final positive photographic prints.

5. A method according to claim 4 wherein the order form is printed on the proof paper at the same time that the negatives are printed on the proof paper.

6. A method according to claim 4 wherein the order form includes provision to order symbolically identified packages of final positive photographic prints and the combined print and order form is delivered to the subject with an envelope on which is imprinted information with respect to the content of the various symbolically identified packages on the order form.

* * * * *